US008817002B2

(12) United States Patent
Robinson et al.

(10) Patent No.: US 8,817,002 B2
(45) Date of Patent: Aug. 26, 2014

(54) DATA DISPLAY ADAPTED FOR BRIGHT AMBIENT LIGHT

(75) Inventors: James Alexander Robinson, Elmira (CA); Michael Lorne Purdy, Kitchener (CA); Antanas Matthew Broga, Cambridge (CA); Nikesh Parsotam, Scarborough (CA)

(73) Assignee: BlackBerry Limited, Waterloo Ontario (CA)

( * ) Notice: Subject to any disclaimer, the term of this patent is extended or adjusted under 35 U.S.C. 154(b) by 220 days.

(21) Appl. No.: 13/418,437

(22) Filed: Mar. 13, 2012

(65) Prior Publication Data

US 2013/0069924 A1 Mar. 21, 2013

Related U.S. Application Data

(60) Provisional application No. 61/530,160, filed on Sep. 1, 2011.

(51) Int. Cl.
*G06F 3/038* (2013.01)

(52) U.S. Cl.
USPC .......................................................... 345/207

(58) Field of Classification Search
None
See application file for complete search history.

(56) References Cited

U.S. PATENT DOCUMENTS

| | | | | |
|---|---|---|---|---|
| 3,027,421 | A | 3/1962 | Heijligers | |
| 3,622,696 | A | 11/1971 | Macintyre, Jr. | |
| 4,965,574 | A | 10/1990 | Fukushima et al. | |
| 5,347,293 | A | 9/1994 | Wiedemann et al. | |
| 6,172,725 | B1 | 1/2001 | Lengyel | |
| 6,411,306 | B1 | 6/2002 | Miller et al. | |
| 6,947,017 | B1 | 9/2005 | Gettemy | |
| 7,015,955 | B2 | 3/2006 | Funston et al. | |
| 7,746,431 | B2 | 6/2010 | Jepsen | |
| 2005/0037815 | A1 * | 2/2005 | Besharat et al. | 455/566 |
| 2005/0108642 | A1 | 5/2005 | Sinclair, II | |
| 2005/0212824 | A1 | 9/2005 | Marcinkiewicz et al. | |
| 2008/0078921 | A1 * | 4/2008 | Yang et al. | 250/205 |
| 2009/0128530 | A1 | 5/2009 | Ek | |
| 2009/0262128 | A1 | 10/2009 | Gettemy | |
| 2011/0032227 | A1 * | 2/2011 | Miyaguchi | 345/207 |
| 2011/0035552 | A1 | 2/2011 | Heynen et al. | |

FOREIGN PATENT DOCUMENTS

| | | |
|---|---|---|
| EP | 1720149 | 11/2006 |

OTHER PUBLICATIONS

Extended European Search Report dated May 15, 2012 for EP 12159315.
EESR dated May 30, 2012 for European Patent Application No. 12159315.6.
European Examination Report dated Sep. 18, 2013 for European Application No. 12159315.6.

* cited by examiner

*Primary Examiner* — Joseph Haley
(74) *Attorney, Agent, or Firm* — Jeffrey N. Giunta; Fleit Gibbons Gutman Bongini & Bianco PL

(57) ABSTRACT

Systems and method to generate more readable modified images that are presented on electronic displays in bright ambient light, such as direct sunlight. Images normally presented in lower ambient light are modified to generate modified images that have higher contrast and that contain less information. For example, modified images contain pixels that are either “on” or “off” and may be inverted to present a black on white background image on the display. Some information, such as text fields or icons, is removed from the modified image to increase readability in bright ambient light. A backlight level of the display is also able to be increased in bright ambient light.

20 Claims, 4 Drawing Sheets

DATA DISPLAY ADAPTED FOR BRIGHT AMBIENT LIGHT

CROSS-REFERENCE TO RELATED APPLICATION

This application is based upon and claims priority from prior U.S. Provisional Patent Application Ser. No. 61/530,160 filed on Sep. 1, 2011, the entire disclosure of which is herein incorporated by reference in its entirety.

FIELD OF THE DISCLOSURE

The present disclosure generally relates to displaying data on electronic devices and more particularly to effectively presenting images on electronic display in bright ambient light conditions.

BACKGROUND

Electronic devices often display or present information that is derived or created by the device. For example, user prompts for inputs, various operational status information, or other information, are displayed on a device's alphanumeric or graphical display. Devices, particularly portable electronic devices, sometimes operate in bright ambient light conditions that can include operations in direct sunlight. Electronic displays, particularly graphical electronic displays adapted to present graphical or text information in different fonts, often utilize backlit Liquid Crystal Displays (LCD), Organic Light Emitting Diodes (OLEDs), or other technologies that generally produce images that lack a sufficient contrast to make reading of the image easy or even possible when the display is illuminated by bright ambient light, such as by direct sunlight. Some display technologies add design features to the display hardware itself to provide improved readability when the display is illuminated by bright ambient light, such as direct sunlight, but these displays generally have greater design complexity and thereby have increased cost or manufacturing complexity relative to using conventional display hardware.

Therefore, the displaying information on a conventional display is limited by the effect of bright ambient light on the display.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
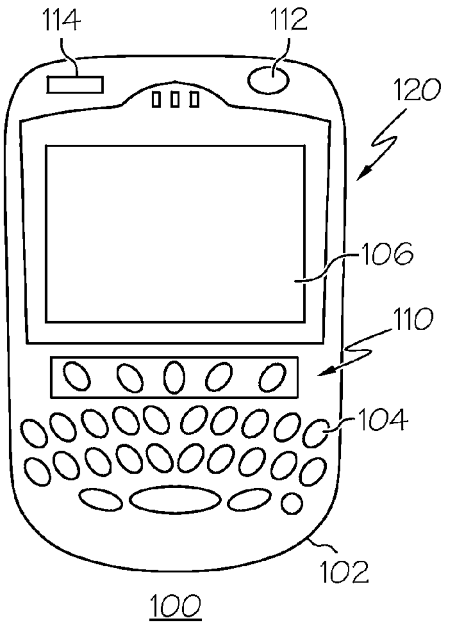
FIG. 1 depicts a wireless communications device front view according to one example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods create images that enhance the ability of a user to see the image in bright ambient light when those images are presented on conventional or slightly modified display equipment. These images are able to contain presentations of data in the form of, for example, text, alpha-numeric characters, graphs, graphical indicators, icons, or the like. These images are also able to present graphical data, such as photographs, visual depictions of data, or the like. The created images are able to be displayed on conventional display hardware, such as on a conventional backlit Liquid Crystal Display (LCD) or Organic Light Emitting Diode (OLED) display, that is not specifically modified to enhance the display hardware's performance in bright ambient light. Modified hardware designed to operate effectively in bright ambient light levels is also able to be used to present these modified images, thereby making the modified hardware even more effective. The below described systems and methods operate to create images that result in high contrast displays that result in higher readability when interacting with high levels of incident ambient light on the display equipment.

The systems and methods described below operate by displaying a first image to a user on a display when ambient light levels in the vicinity of the display are detected to be in a first range. The first image in one example is an image that is not modified to enhance its display in higher ambient light environments. The first range in this example corresponds to a lower ambient light level environment where displayed images can generally be effectively viewed without modification. In one example, the first image presents a first set of information or data as a full color or gray scale image.

In order to present more readable images in higher ambient light environments, modified images are presented to the user on the display. In one example, a modified image is created by modifying at least a subset of data presented in the first image, which includes a full color or gray scale image, according to one or more techniques. The modified image is able to be created by modifying some or all of the data presented in the first image so as to enhance the ability of a user to see the modified image in a higher ambient light environment. In one example, the modified image is created by selecting a subset of the information or data that is presented in the first image. The subset of information contains less information than is presented in the first image. In one example, the modified image presents only the subset of information.

The information or data presented in the first image is able to consist of pixels of a photograph or other graphical data, information that is presented through a representation in the image (such as alpha-numeric or graphical data depicted in the image), or combinations of pixels and information presented in the image. Differently modified images are then selected for display according to a determination of a brightness range into which a current detected ambient light levels fall.

In one example, as the ambient light level increases above a first threshold and enters a second range, a first modified image is displayed that is created by modifying the first image, which contains a full-color or gray scale image, so as to present at least some pixels that are contained in the first image as pixels in the first modified image that are either in an "on" state or in an "off" state to create a monochrome image that consists of a high contrast black and white image with highly contrasting pixels. As described below, images with at least some pixels that are either "on" or "off" are referred to as presenting those pixels as "bi-level" pixels. In one example, a pixel that is in an "on" state is a pixel that is displayed with a maximum or close to maximum intensity level so as to appear "bright" to an observer. A pixel that is in an "off" state is displayed with a minimum or close to minimum intensity level so as to appear "dark" to an observer.

As the ambient light level increases above a second threshold, and therefore into a third range, a second modified image is displayed that is created by modifying the monochrome image of the first modified image so as to present at least some pixels in the second modified image as being "inverted" relative to the first modified image. The inverted pixels of the second modified image are created by changing at least some of the pixels in the monochrome image that are "off" state to being in the "on" state, and changing pixels in the first image that are in the "on" state to being in the "off" state. In these modifications, the pixels that are changed are a subset of data contained in the initial image that is presented in lower ambient light conditions.

As the ambient light level increases beyond a third threshold and into a fourth range, a third modified image is displayed to the user that is created by further modifying the second modified image, which is an inverted, monochrome image as described above, by reducing the amount of information presented in the third modified image. The third modified image is also able to be modified by presenting the reduced amount of information with increased size in order to further facilitate reading of the display in bright ambient light conditions. The reduced information that is presented in the third modified image in one example includes alphanumeric information or graphical symbols.

The above example describes a sequence of image modifications that are made to a first image with increasing levels of detected ambient light. Further examples use different ordering of modifications that are used to create modified images that are displayed to a user with increasing levels of ambient light.

In one example, the modification or selection of an image is determined based upon a range in which a current determined ambient light level falls. In the above described example with three ambient light thresholds and four corresponding ranges, different ranges of ambient light are defined to: 1) lie between each threshold; 2) above the highest threshold; and 3) below the lowest threshold. For example, detected ambient light levels below the first threshold are in a first range, while ambient light levels between the first threshold and the second threshold are in a second range. The ranges proceed with increasing levels of ambient light. In various examples, the defined ranges are able to overlap.

The created monochrome images are generally defined so that each of at least some pixels in the image produces either a maximum amount of brightness (i.e., is a "bright" or an "on" pixel), or a minimum amount of brightness (i.e., is a "dark" or an "off" pixel) to produce a high contrast image that is displayed to the user. "On" pixels are able to be white or a particular color. In one example, the "on" pixels have a color that corresponds to a backlight color of the display device. "Off" pixels are generally configured to be dark or a physical background color of the display.

In one example, high contrast monochrome images to be displayed in bright ambient light conditions are created based upon a full color or grayscale image by comparing a brightness level of each of at least some pixels in the initial image to a defined level. At least some of the pixels with brightness levels below the defined level are set to "off" in the monochrome image and at least some of the pixels with brightness levels above the defined level are set to be "on" in the monochrome image. In various examples, an "off" pixel is referred to as a dark pixel and an "on" pixel is referred to as a bright pixel. The defined level is able to be set by various techniques, such as through empirical observations under various bright ambient light conditions of the performance of display hardware to be used to present the image. The pixels that are modified are a subset of the data contained in the initial image that is modified to create the various monochrome images.

Images that are intended to be displayed in lower ambient light conditions sometimes have a dark or black background with bright lines drawn on the dark background to outline or create images to be presented. Such images are often difficult to read in bright ambient light, such as in direct sunlight, even when converted to a monochrome image with pixels having one of a maximum or a minimum brightness level. In order to further improve the readability of some image in brighter ambient light, the monochrome image is inverted so that "on" pixels are changed to "off" pixels and "off" pixels are converted to "on" pixels. In some examples, an image is inverted by changing a subset of data in the initial image, the subset containing at least some pixels in an initial image, such that pixels that have a brightness level below a defined level are presented as a bright pixel, and presenting at least some pixels in the initial image that have a brightness level above the defined level as a dark pixel. In this example, the defined level is identified by, for example, empirical observations of unmodified images to be displayed and determining pixel levels for brightness, intensity, or other quantities that define an "on" or an "off" state for information being presented.

In various examples, a modified image to be displayed to a user in bright ambient light is able to be a modified color image that is created from what can be referred to as a first image that contains a first set of data. In some examples, the first image is a full color image and modified images are created by modifying, according to various techniques, at least some of the data, such as pixels creating the image, information presented in the image such as alpha-numeric characters, or pixels and information, presented in the first image. For example, the modified images are able to be images that contain portions, or that are entirely, monochrome or two-color (e.g., black and white, blue and white, and so forth) images, as is described above, that are crated by changing all or some pixels in the image. In further examples, a subset of available colors is selected to be used to present pixels of the modified image. This subset of colors is able to include, for example, between three and sixteen intense and representative colors to which the color gamut of the initial image is mapped. In one example, the modified image has at least some pixels that are presented with fewer possible levels of brightness relative to those pixels in the unmodified, full color image that is presented in lower ambient light conditions. Modified images are also able to consist of full grayscale images or grayscale images that have pixels defined as grayscale pixels. An example of grayscale pixels are pixels having a full range or a reduced number of possible levels of brightness, such as pixels having one of 16 possible shades of gray.

The modified images to be presented in bright ambient light are also able to be created by filtering or processing a full color or full grayscale image with an image processing algorithm to modify pixel brightness values. For example, grayscale images are able to be filtered or processed with an algorithm that modifies the brightness levels of pixels with mid-level brightness levels to be closer to either a dark end or a light end of the brightness scale based on a brightness weighting factor or other considerations. A modified image is also able to be created by processing a full color image with a filtering or image processing algorithm that modifies brightness levels of pixels with mid-level brightness levels for either each color component or the composite pixel to have either a dark brightness level or a light brightness level based on a brightness weighting factor or other considerations. In a particular example, the modified image is created by increasing brightness levels of pixels that have brightness levels above a defined level, and by decreasing brightness levels of pixels that have brightness levels below that defined level. In modifying the brightness value of color pixels, various algorithms are able to separately modify the brightness level of individual component color pixels within each color pixel, modify the composite brightness of the color pixel by modifying the component color pixels of each pixel according to a defined relationship, modify brightness of a pixel according to other relationships between component pixel brightness, or by combinations of these techniques.

Modified images are also able to be created by modifying the gamma of the initial image. In one example, images to be displayed in lower ambient light level environments have a gamma value of between 2 to 2.2. It has been observed, however, that human eyesight is generally more sensitive to dim colors and less sensitive to bright colors. Based on that observation of human vision, a modified image is able to be generated by altering at least some pixels in an initial image to increase their gamma values relative to the unmodified, initial image. Examples of images created with modified gamma values include changing at least some pixels in the initial image so that the generated modified image has pixels with a gamma value between 2.5 and 3.0. Further examples modify pixels in the initial image to generate a modified image with an increased gamma value that is up to a value of 4.0 or larger. Modified images are further able to be created that present pixels with an arbitrarily large gamma value.

The modified image to be presented in bright ambient light is able to be created by various processes. For example, an electronic device incorporating a display that presents the modified image is able to perform image processing on an initial image to create the modified image shortly before presenting the image on the display. Alternatively, modified images, or templates for modified images, are able to be created beforehand and stored in the device for retrieval and presentation on the display. These stored modified images are able to be created, for example, as part of an user interface design that includes images to be presented in lower ambient light conditions and other modified images of similar or different design that are to be presented in higher ambient light conditions. These stored modified images are able to be designed with particular areas or image components, such as data fields, that are able to be completed or "filled in" by processing within the device at or before the time the images are presented to the user. In an example, the image components of stored images that are modified with dynamic data prior to being presented to a user are referred to as dynamic fields. Examples of dynamic fields within an image, either a conventional image or a modified image, includes fields to present a time of day, an incoming phone call originating telephone number, a number of missed telephone calls, or any such dynamic data.

In addition to modifying the image to be displayed, some examples further increase a level of backlight intensity on the display upon a determination of bright ambient light conditions. Increasing the level of a display's backlight is able to be performed in response to determining that the detected ambient light level for the device exceeds a threshold or the detected ambient light level is in a particular range. Increasing the level of a display's backlight is able to be combined with any one or more of the above described image modification techniques to enhance readability in bright ambient light environments. Alternatively, increasing the level of the display's backlight is able to be performed by itself in response to determining that the ambient light level of the device has exceeded a corresponding threshold or is in a corresponding range. The threshold at, or range within, which the level of the display's backlight is increased is able to be determined by, for example, empirical observations of the performance of the display in various ambient light conditions.

FIG. 1 depicts a wireless communications device 120 front view 100 according to one example. The wireless communications device 120 includes a housing 102 to enclose electronic circuits, power sources, and possibly other components of a wireless communications device. The wireless communications device 120 has a keyboard 104 and various user interface components 110 mounted on its front. Examples of the user interface components 110 mounted on the front of the wireless communications device include trackballs, track pads, function keys that have a fixed definition, reconfigurable, programmable definitions, or both.

The wireless communications device of this example includes a display 106 mounted on its front side. The display 106 of various examples is able to include a graphical display that presents images in a color or in a monochrome format. The display 106 of various examples is controllable to present information by activating individually controlled pixels or by activating display of alpha-numeric or graphical information images. In one example, the display 106 is a liquid crystal display (LCD) that presents graphical data, including alphanumeric data, by individually controlling each color pixel of the display. In another example, the display 106 includes a monochrome display that allows the control of a "gray scale" intensity for each pixel.

The illustrated wireless communications device 120 includes two ambient light detecting devices, a front facing camera 112 and a light sensor 114. Front facing camera 112 is generally used to capture images as photographs or a video to support, for example, video conferencing. A front facing camera 112 in some examples, as is discussed in greater detail below, is able to capture images that are analyzed to determine an estimated level of ambient light. The light sensor 114 of one example produces an output in proportion to the amount of ambient light incident on the light sensor 114. In some examples, the light sensor 114 is a photo diode, phototransistor, or other light sensitive electronic device that produces an output that is measured to determine an estimate of ambient light. In various examples, a wireless communications device or other electronic device is able to have only one ambient light detecting device, two ambient light sensing devices, or any number ambient light sensing devices to support the below described operations.

Figure 2:
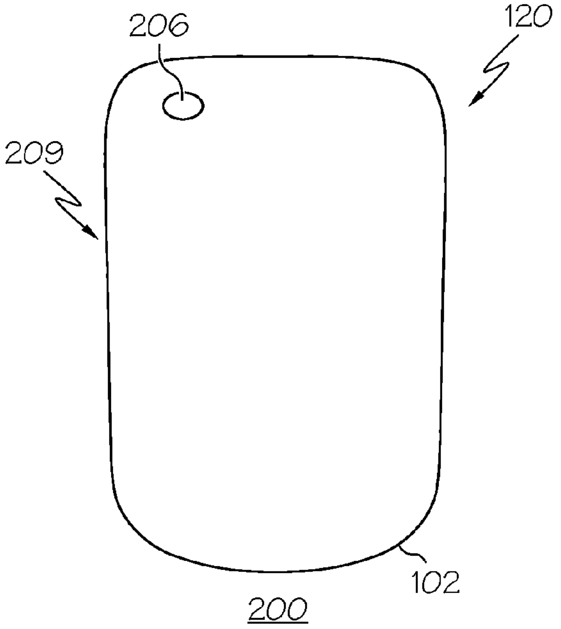
FIG. 2 illustrates a back view the wireless communications device discussed above with regards to FIG. 1.

FIG. 2 illustrates a back perspective view 200 the wireless communications device 120 discussed above with regards to FIG. 1. The back perspective view 200 shows a back side 204 of housing 102. The back side 204 has a rear facing camera 206. In various examples, the rear facing camera 206 captures images that are analyzed to estimate ambient light levels.

Figure 3:
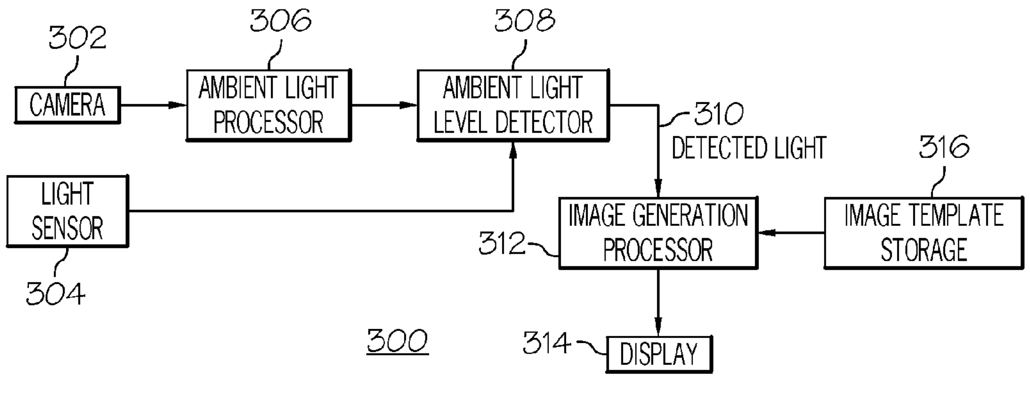
FIG. 3 illustrates a block diagram of an ambient light compensated display circuit according to one example.

FIG. 3 illustrates a block diagram of an ambient light compensated display circuit 300 according to one example. The ambient light compensated display circuit 300 illustrates two light detecting devices, a camera 302 and a light sensor 304. As discussed above, various examples of ambient light compensated display circuits are able to alternatively include only one of these light detecting devices, or any number of light sensing devices.

Camera 302 operates to capture images for either still pictures or video. Images captured by camera 302 are received by an ambient light processor 306 and analyzed to estimate an ambient light level. As discussed above with regards to FIGS. 1 and 2, a camera 302 is able to be a front facing camera 112, a rear facing camera 206 or a combination of both. The ambient light processor 306 is able to determine an estimate of ambient light levels by, for example, summing or averaging the intensity of each pixel of one or more images captured by the camera 302 or captured by a combination of multiple cameras in devices configured to use multiple cameras to estimate ambient light levels. In some examples, the ambient light processor 306 uses calibration data for the camera 302, or for each of multiple cameras, to improve the estimate of ambient light levels.

The light sensor 304 in one example is similar to the light sensor 114 discussed above with regards to FIG. 1. The light sensor 304 detects an ambient light level and produces an ambient light level indicator that is proportional to or otherwise a function of the detected level of ambient light. Light sensor 304 is able to be used for other purposes by a device incorporating the ambient light compensated display circuit 300. For instance, referring to FIG. 1, light sensor 304 is able to be the light sensor 114 that is also used to detect an object in proximity to a front side of the wireless communications device 120. In one example, light sensor 114 is used to dim the display 106 when an object, such as a user's face, is in proximity to the front of the device.

An ambient light level detector 308 receives indications of ambient light levels from one or more of the ambient light processor 306 or light sensor 304. In a further example, another ambient light processor (not shown) is able to process data derived by the light sensor 304 and the processed ambient light indication is provided to the ambient light level detector. The ambient light level detector 308 in one example determines ambient light based upon detected ambient light level indicators received from one or both of the ambient light processor 306 or light sensor 304. The ambient light level detector 308 of one example compares the determined ambient light levels to defined ambient light level thresholds. The ambient light level detector 308 then outputs an ambient light level indicator that, in one example, encodes quantized levels of ambient light in the form of detected light levels 310.

In one example, the ambient light level detector 308 outputs the ambient light indicator as a representation of detected light levels 310 with one of four possible values. These four possible values correspond to an indication that the determined ambient light levels are within one of four defined ranges. The ranges may overlap (e.g., a particular level of ambient light might be in the high end of a range ambient light levels characteristic of an office, and simultaneously in the low end of a range of ambient light levels characteristic of an outdoor setting). For simplicity, the following discussion may proceed principally in terms of thresholds, which may reflect the boundaries of ranges, or the boundaries at which there is no overlap of the ranges, for example. In further examples, the detected light levels 310 are able to represent any number of defined ranges, based upon a fewer or a greater number of ambient light thresholds discussed below. The ranges in this example correspond to ambient light levels that represent, in one example, the following cases:

1) the device is in direct sunlight;
2) the device is in very bright ambient light;
3) the device is in bright ambient light; or
4) the device is not in bright ambient light.

The ambient light level indicator representing the detected light levels is received by an image generation processor 312. The image generation processor generates, by selecting or creating, images to be presented to a user of a device including the ambient light compensated display circuit 300. The image generation processor 312 provides display information to a display 314. In the example described above with regards to FIG. 1, the image generation processor 312 generates images that are presented on display 106. These images are generated, for example, by retrieving stored images or image templates that are completed by processing within the image generation processor 312, or in another example these images are able to be generated by processing within the image generation processor 312. In an example, stored templates are completed by the image generation processor 312 by filling in dynamic fields such as time of day, incoming call originating telephone number, or the like.

The image generation processor 312 in one example, is able to present modified image on the display 314 in brighter ambient light that have changes in pixel brightness levels relative to images presented on the display 106 in lower ambient light. The image generation processor 312 is also able to these generate modified images that present less information, such as modified images that do not include graphics, data such as call history, or the like.

In one example, the image generation processor 312 is further able to control the emitted light intensity, such as a backlight output intensity or other brightness output, of the display 314. In an example of a Liquid Crystal Display (LCD) display 314, a backlight producing element is a light source that supplies light that is selectively passed by pixels of the LCD display. The emitted light intensity of other types of displays, such as Organic Light Emitting Diode (OLED), plasma displays, and so forth, is also able to be similarly varied by appropriate techniques.

The image generation processor 312 in one example generates, by creating or selecting, a modified image to be presented on the display 106 based upon the detected light level determined by the ambient light detector 308. In one example, when the detected light level indicates that the device is not in bright ambient light, the image generation processor 312 generates, by creating or selecting, an initial, or first, image that uses the full color pallet available for the particular display. The initial image includes an initial presentation of a data set. Examples of data sets include call duration data, a person's contact information, or other data presented to a user on a device. An example of not being in bright ambient light includes being in an indoor environment or in a heavily shaded, relatively dark, outdoor. In cases where the image generation processor 312 controls the emitted light intensity, the emitted light intensity is set to a normal level when the detected light level indicates that the device is not in bright light.

In one example, the image generation processor generates a modified image that includes a modified presentation of data. The modified presentation presents a subset of the data set presented in the initial presentation that is a part of the first image. That subset of the data set presented in the initial presentation generally contains less data than the data set of the initial presentation.

In cases where the image generation processor 312 adjusts the emitted light intensity of the display 314, the emitted light intensity is increased when the ambient light level is greater than the level indicating that the device is not in bright ambient light. In particular, a determination that the device is in ambient light that is determined to be "bright ambient light" or brighter causes the image generation processor 312 to increase the brightness level of the emitted light of display 314. In an alternative example that has an image generation processor 312 that does not control emitted light intensity, no changes to the display or displayed image are made in response to determining that the device is in bright ambient light.

The image generation processor 312 of one example generates, by creating or selecting, additionally modified images to be displayed when the detected light levels 310 indicates that the device is in "very bright ambient light." In one example that uses a Liquid Crystal Display (LCD) for display 314, the created image uses only completely "on" or completely "off" pixels. Other display technologies are similarly able to be provided with image data that similarly produces high contrast images.

The modified image to be displayed when the device is determined to be in "very bright ambient light" is generated, by being created or selected, so as to present the displayed image components, such as text characters or line graphics, with pixels that are dark, i.e., black, or completely "off," that appear on a white or other monochrome background that consist of pixels that are bright, or "on." In other words, the initial image, which is displayed in less bright ambient light as a full color image, is modified so as to represent at least some pixels in the initial image as respective "bi-level" pixels to form a "bi-level" monochrome image.

The creation of the "bi-level" monochrome image is also able to be combined with inverting the image from presenting predominately white text on black background to an image presenting black text on white background image. The term "bi-level" in this context refers to pixels, or images that are made of pixels, that are mostly or completely either "on" pixels, referred to as bright pixels, or mostly or completely "off" pixels, referred to as dark pixels, so as to create a high contrast between pixels presenting information to a viewer. Generating a modified image by inverting the initial image is performed in one example by inverting pixels in the initial image to obtain the modified image. An example of inverting pixels in the initial image defining pixels in the initial image with brightness levels below a defined level as respective bright pixels, and defining pixels in the initial image with brightness levels above a defined level as respective dark pixels.

In examples that control the emitted light intensity of the display 314, the emitted light intensity is able to be increased when presenting a bi-level image. The increased emitted light intensity is able to also be used with a non-inverted, or white text on black background image, or with an inverted image presenting black text on a white background. In further examples, the emitted light intensity or other brightness level of the display 314 is not adjusted when presenting a bi-level image in response to a detection of very bright ambient light.

The image generation processor 312 generates, by creating or retrieving, a further modified image to be displayed when the detected light levels 310 indicates that the device is in "direct sunlight." In one example the image generation processor 312 generates a modified image that contains less information or data (e.g., fewer data items—such as icons, images, graphics or text elements—or fewer colors), than are contained in the initial images that are displayed in lower ambient light levels. Examples of images containing less information are described below.

The above describes one example of generating, by either creating or retrieving, modified images and increasing display emitted light intensities based upon detected ambient light levels. In further examples, the changes made in the creation of the modified images and emitted light intensity changes are able to occur in different sequences or in various combinations as detected ambient light levels increase. For example, one further example is able to define one threshold level of ambient light that causes, when the detected ambient light level exceeds that threshold, a transition from displaying full color images with pixels having varying color intensities to displaying bi-level, inverted images with increased emitted light intensity. Further combinations, ordering, and other image modification actions based upon the above described or further ambient light level thresholds are also able to be incorporated in various designs or configurations.

The above described image modifications are focused on creating a bi-level monochrome image for presentation in bright ambient light conditions. As discussed above, other image modifications are able to be made to enhance the readability of the image in bright ambient light.

The image generation processor 312 is able to generate modified images by performing the above described modifications to initial images that are displayed in lower ambient light levels. In further examples, the image generation processor 312 stores templates of images in an image template storage 316. Image templates define the structure of images used to present information. The image generation processor 312 of one example retrieves image templates to present data selected by a user of the device, fills in the actual data into the template structure, and provides the complete image to the display 314. In such examples, the image generation processor 312 generates an initial image or a modified image by selecting which template to use, either a normal template or a modified template, based upon the detected light levels 310.

Figure 4:
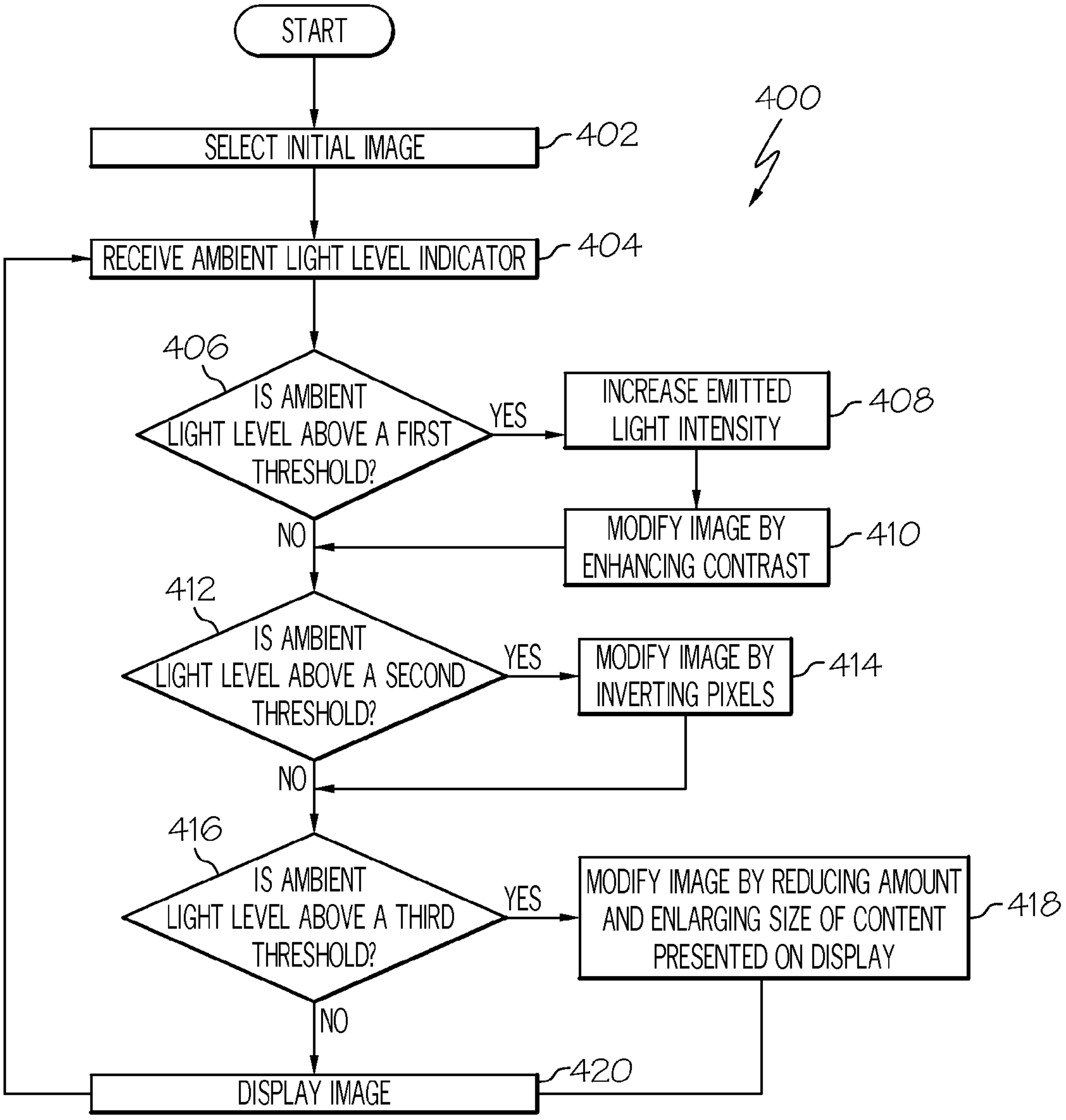
FIG. 4 illustrates an image modification process in accordance with one example.

FIG. 4 illustrates an image modification process 400 in accordance with one example. The image modification process 400 modifies a first image to create a modified image to be presented in a bright ambient light environment. The described image modification process 400 includes modifying the first image to creating a monochrome, bi-level image. Further examples are able to modify the first image in different manners, such as by generating a modified image with a pallet of fewer possible colors, by generating grayscale images, altering mid-level brightness pixels to have more extreme higher or lower brightness level, by modifying the gamma of the first image, or by any combination of these techniques. Image modification is also able to modify all pixels of an image or only some pixels of the image in order to better highlight important information. The image modification process 400 is able to be performed by a device as part of presenting an image, or the image modification process 400 is able to be performed separately from presenting the modified image, whereby the modified image is stored in the device and retrieved for later presentation. As discussed above, image templates are able to be stored in an image template storage 316 and actual data content to be displayed is inserted into the image template to create an image to be displayed.

The image modification process 400 begins by selecting, at 402, an initial image to display to the user. The selection of an initial image is based upon, for example, the processing of the device that is displaying data or other images to the user. In general, the selected image presents information according to a user interface need for the device.

The image modification process 400 continues by receiving, at 404, an ambient light indicator. The received ambient light indicator in one example corresponds to the detected light levels 310 discussed above. Various designs are able to receive ambient light indicators as a data item, such as a digitally conveyed value, that reflects measurements of ambient light produced by a light sensor 304, camera 320, ambient light processor 306, or any combination of these or other ambient light detecting devices. In further designs, the received ambient light indicators are able to be indicators, such as encoded data including flags or the like, that indicates that ambient light, as detected by some technique, exceeds a threshold indicated by the encoding. In an example that uses the above described three thresholds of ambient light that reflect four levels of ambient light, the ambient light level indicator is able to have a decimal value of, say, one, two, three, or four that corresponds to ambient light levels indicating that the device is in, respectively: 1) direct sunlight; 2) very bright ambient light; 3) bright ambient light; or 4) not in bright ambient light.

The image modification process 400 continues by determining, at 406, if the ambient light level is above a first threshold. The first threshold in this example is able to correspond to determining that the ambient light level indicator indicates that the device is in bright ambient light. As is discussed above, bright ambient light in this example is a first level of ambient light brightness above an ambient light level associated with indoor or mildly bright ambient light. The light threshold is able to be defined by any suitable technique that is able to be based upon, for example, observed characteristics of the display 314 and ambient light levels where conventional images, such as full color images with multiple color levels, become difficult to read on that display.

In one example, the emitted light intensity of the display presenting the image is increased, at 408, in response to determining that the device is in bright ambient light. As discussed above, the processing used to increase the emitted light intensity of the display depends upon the design of the display. For example, backlight intensity is able to be increased on displays with a backlight, such as LCD displays. Emitted light intensity of some other devices, such as OLED displays, is increased by adjusting the brightness of the pixel components.

In one example, the image is also modified, at 410, to generate a modified image by enhancing the contrast of pixels in the initial image. In one example, enhancing the contrast of pixels in the initial image presents the modified image as a "bi-level" or two level pixel display. As discussed above, a "bi-level" display is a display where the brightness level of each pixel is defined to be one of two possible levels, either completely "on," or completely "off." One example of bi-level pixels are pixels that are either "white" or "black." In other examples, other colors are able to be used such as white on blue bi-level pixel colors. In general, bi-level pixels are selected to create a high or maximum level of contrast between the two possible levels.

Further modifications to the initial image are possible to generate a modified image enhancing the contrast of initial image. For example, a modified image is able to be generated that has a pallet of fewer possible colors than the initial image. In such a modified image, the modified image has color component pixels that are defined to have fewer possible brightness levels relative to corresponding pixels in the initial image. Examples of color component pixels include Red, Green, and Blue (RGB) sub-pixels that comprise a color pixel of an color display. The brightness, or intensity, of each sub-pixel of many displays are able to be controlled independently, and limiting the possible brightness levels of each sub-pixel limits the possible brightness level of each color component of a particular pixel.

A modified image is able to be generated by increasing the contrast of the image through a process that defines pixels in the modified image by increasing the brightness levels of each pixel within the initial image that is above a defined level, and decreasing brightness levels of each pixel within the initial image that is below the defined level. Increasing the contrast of the image is also able to include increasing a gamma value of at least some pixels in the modified color image relative to gamma values of corresponding pixels in the initial image.

The image modification process 400 continues by determining, at 412, if the ambient light level is above a second threshold. The second threshold in this example is able to correspond to determining that the ambient light level indicator indicates that the device is in very bright ambient light. An example of very bright ambient light is being in a somewhat shaded outdoor area that has a relatively strong level of ambient light. This light threshold is able to be defined by any suitable technique similar to those discussed above for defining a bright ambient light threshold.

In one example, the displayed image is modified in response to determining that the ambient light level is above the second threshold by modifying the modified image generated by the above by inverting pixels in the modified image, at 414. In this example, the above modified image includes bi-level pixel data and the inverting includes modifying the bi-level pixels from presenting white or monochrome dots or lines on a black background to presenting black dots or lines or a white or monochrome background. As described above, the above modified image was generated in this example by modifying the initial image in response to determining that the ambient light level is above the first threshold. As shown, in some examples the effects of the ambient light level exceeding increasing light level thresholds results in cumulate modifications to displayed images. In further examples, the modifications performed in response to determining that ambient light levels exceed a lower threshold are not retained as the ambient light levels are determined to exceed higher ambient light thresholds. In other words, in these further examples, modifications to the initial image that are made for display at lower ambient light levels are not necessarily retained when modifying the image for display at higher ambient light levels.

As discussed above, this example describes increasing the emitted light intensity of the display and modifying the displayed image to a bi-level image in response to the ambient light level being above the first threshold, and responding to the ambient light level being above the second threshold by inverting the bi-level image. In the example described above with regards to FIG. 3, the emitted light intensity of the display is increased in response to the ambient light level being above the first threshold, and in response to the ambient light level being above the second threshold the image is modified to a bi-level image that is also inverted. In various examples, different combinations of modifications are able to be made in response to detecting that ambient light levels are above particular thresholds. Furthermore, fewer or greater numbers of thresholds are also able to be defined and various responses are possible when the ambient light level is detected to exceed those thresholds.

The image modification process 400 continues by determining, at 416, if the ambient light level is above a third threshold. The third threshold in this example is able to correspond to determining that the ambient light level indicator indicates that the device is in direct sunlight.

In one example, a modified image is generated in response to determining that the ambient light level is above the third threshold by reducing an amount of content and enlarging the size of content presented in the above modified image, at 418. In one example, the amount of content is reduced by reducing the amount of text, graphics, or text and graphics in the modified image that is displayed in direct sunlight. Modifying an initial image or a previously modified image by reducing the amount of text, graphics, or text and graphics is an example of generating a modified image with a modified presentation, where the modified presentation presents a subset of the first data set that contains less data than the first data set. By reducing the amount of text, graphics, or text and graphics, a less cluttered image is displayed that allows a user to more easily find information of interest. The reduction of text, graphics, or both, further allows increasing the size of text or other image components that are presented. An example of these modifications is described below with regards to FIGS. 5 and 6. The image modification process 400 then continues by displaying, at 420, either the initial image if no modifications were made, or the modified image if modifications were made in response to detected ambient light levels. The image modification process 400 then continues by returning to receiving, at 402, an ambient light level indicator.

As discussed above, the modification of displayed images are able to be performed by various techniques. The device displaying the modified images is able to include a processor or processors that modify the images as changes in ambient light levels are detected. Further examples operate by storing images or image templates, that include the above described modifications, and the modified images are generated by retrieving the modified images or image templates and preparing them for display.

Figure 5:
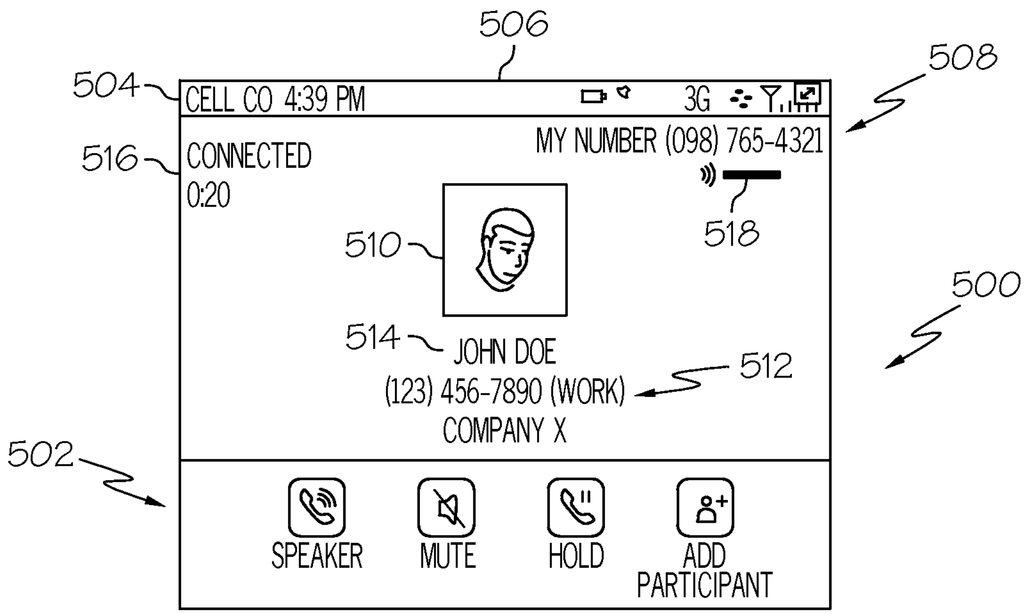
FIG. 5 illustrates a full display in accordance with one example.

FIG. 5 illustrates a full display 500 in accordance with one example. The full display 500 contains information that is normally displayed to a user of a wireless communications device, such as the wireless communications device 120 discussed above. In one example, the full display 500 is created based upon an image template that defines the structure of the image. Actual data, such as the illustrated contact information and operational status information, is then filled into this template to create the full display 500.

The full display 500 contains a first line 504 that depicts operational information, such as a present service provider and time 506, and a call progress indicator 516, that presents a timer of the presently active voice call. The full display further includes a communications link information area 508, that presents information about the current communication link's status. A call control touchscreen interface 502 is also provided that includes icons to enable a speakerphone, mute the call, place the call on hold, or add a participant to the call. A volume indicator 518 indicates the relative volume of sound output produced by the telephone for the call, and reflects the user's volume setting as configured by an available user interface (not shown).

The central portion of the full display 500 shows contact information for one person that is stored in the wireless communications device 120 in this example. The displayed contact information in this example corresponds to an individual with whom the wireless communications device 120 is conducting a voice call. Contact information is able to be shown based upon, for example, user selections or other criteria. Further, similar full displays that contain any type of information are able to be generated and presented to the user.

The full display 500 includes an icon 510 that indicates that the displayed data is contact information for a person. The icon 510 is able to be a photograph of the particular individual, a generic illustration indicating a person's contact information, or any graphical image. A contact name 514, which is "John Doe" in this example, is shown along with a telephone number and company name 512 associated with this individual.

Figure 6:
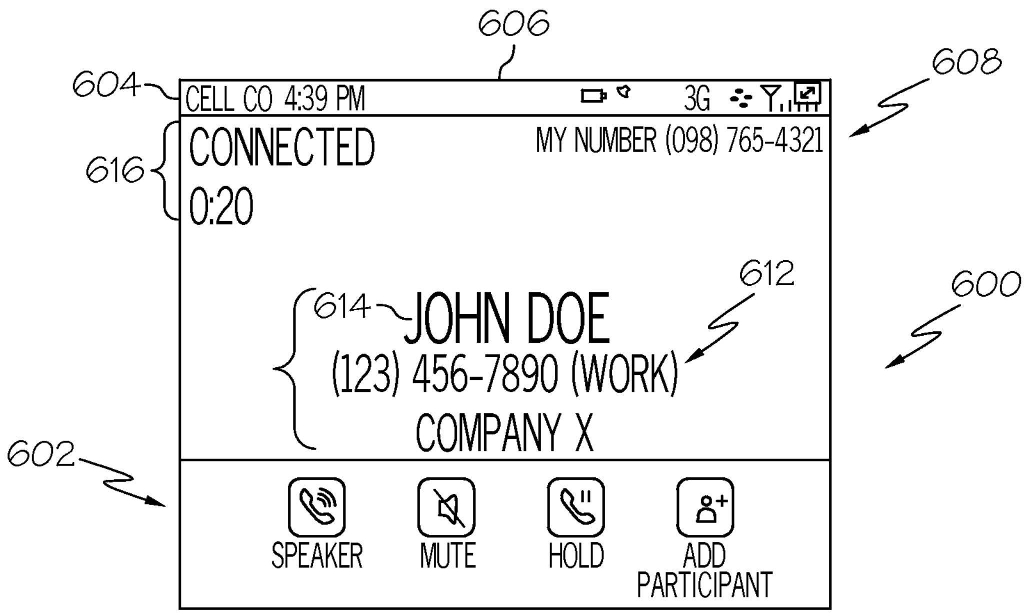
FIG. 6 illustrates a reduced amount and enlarged size display in accordance with one example.

FIG. 6 illustrates a reduced amount and enlarged size display 600 in accordance with one example. The reduced amount and enlarged size display 600 illustrates an image that is presented to a user in bright ambient light conditions. The reduced amount and enlarged size display 600 is so named because, as described below, the displayed image has a reduced amount of data that and the data that is presented is enlarged. These modifications allow easier reading by a user when this image is displayed on the device in bright ambient light.

The reduced amount and enlarged size display 600 is an example of a modified image that is generated for display to a user in response to determining that the display device is in a bright ambient light, such as in direct sunlight. The reduced amount and enlarged size display 600 is derived from the full display 500 by modifying the full display 500 in various ways, as are described below. The reduced amount and enlarged size display 600 is generally displayed on the same display as the full display 500, and is therefore an image of equal size as the as the full display 500. The "enlarged size" name refers to the enlarged text characters used to present more pertinent data. In one example, the reduced amount and enlarged size display 600 is based upon a stored modified image template. The actual data, such as the illustrated contact information and operational status information, is then filled into this template when the modified image is generated for display to the user.

The reduced amount and enlarged size display 600 presents an enlarged call progress indicator 616 that modifies the depiction of data presented by the call progress indicator 516 and the telephone number and company name 512 of the full display 500 by enlarging, relative to a size of the text characters presenting data in that subset of data in the full display 500, the text characters presenting that subset of the data set. In this example, the enlarged call progress indicator 616 presents the data presented in the call progress indicator 516 and the telephone number and company name 512 with a font is enlarged by a defined amount. For example, the enlarged call progress indicator 616 and the enlarged telephone number and company name 612 are created by increasing the size of the font of the call progress indicator 516 and the telephone number and company name 512 by one and one-half (1½) times. Other size increases are able to be used in further examples. In this example, the modified image is generated by defining an enlarged presentation of the call progress indicator 516 and the telephone number and company name 512 for the reduced amount and enlarged size display 600. In this example, the call progress indicator 516 and the telephone number and company name 512 are at least a portion of the subset of the data set presented in the full display 500. The enlarged presentation of these data appear larger than the presentation of that data that is presented in the full display 500. In this example, the full display 500 is an initial image, and the reduced amount and enlarged size display 600 is a modified image generated based upon the initial image.

The enlarged contact name 614 is created in this example by doubling the size of the contact name 514 of the full display 500. Further, the reduced amount and enlarged size display 600 reduces the amount of information presented to a user by removing the volume indicator 518 and the icon 510. Removing some displayed content produces a display that is less cluttered and allows a user to more easily find information of interest in difficult to read environments, such as in direct sunlight. The removed content also frees area of the display for enlarging the remaining presented information.

The reduced amount and enlarged size display 600 presents a call control touchscreen interface 602, a first line 604, including a present service provider and time 606, and a communications link information area 608, with the same size as the corresponding fields of the full display 500. In further examples, other data fields are able to be omitted or reduced in size when modifying a full display 500 to create a reduced amount and enlarged size display. It is further to be noted that the full display 500 and the reduced amount and enlarged size display 600 are presented as black lines on a white background. This is an example of an inverted bi-level image as is discussed above.

Figure 7:
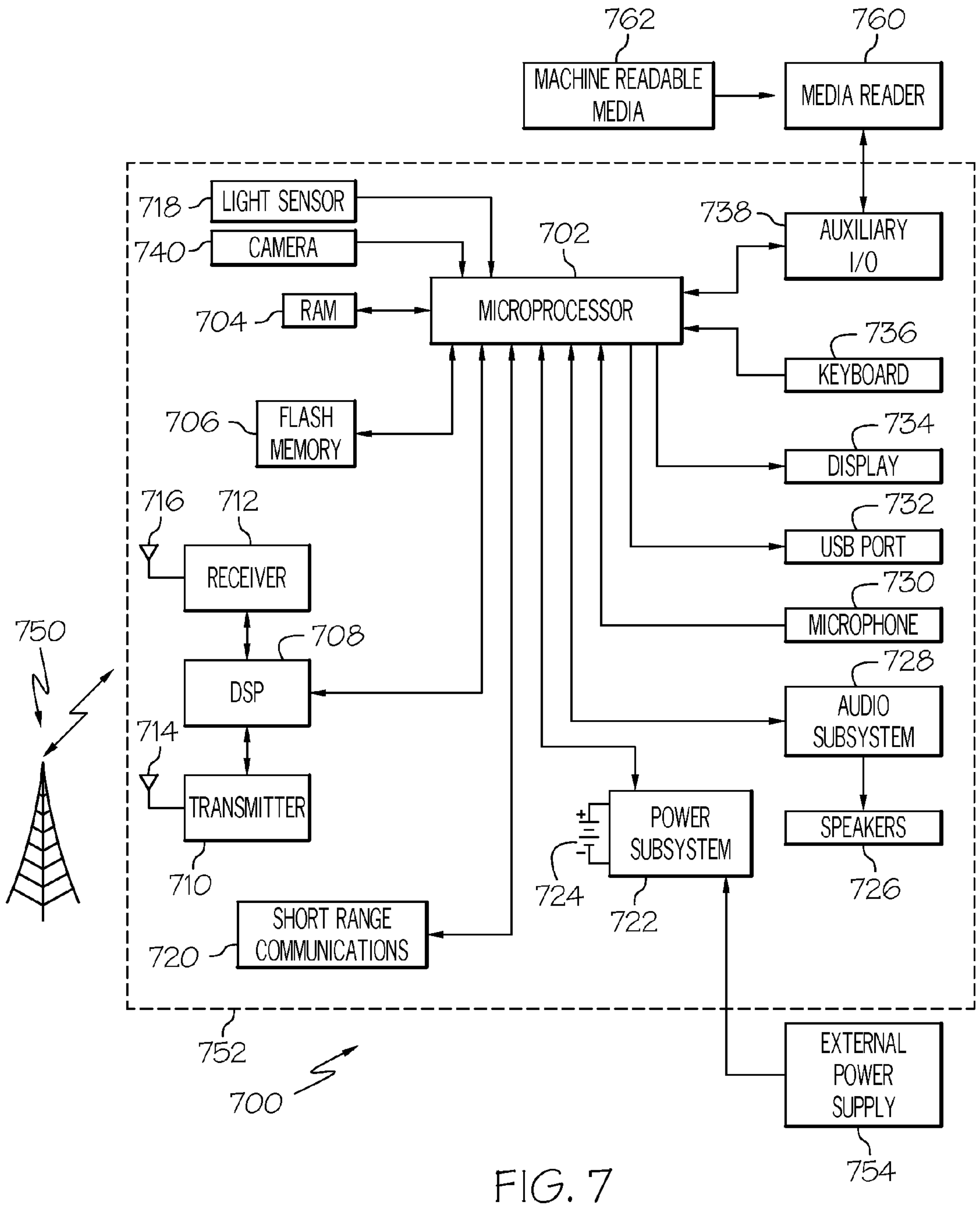
FIG. 7 is a block diagram of an electronic device and associated components in which the systems and methods disclosed herein may be implemented.

FIG. 7 is a block diagram of an electronic device and associated components 700 in which the systems and methods disclosed herein may be implemented. In this example, an electronic device 752 is a wireless two-way communication device that is able to provide one or both of voice and data communication capabilities. Such electronic devices communicate with a wireless voice or data network 750 via any suitable wireless communication protocol or protocols. Wireless voice communication is performed using either analog or digital wireless communication protocols according to the network 750 to which the wireless communication device is connected. Data communication to and from the electronic device 752 support exchanging data with other computer systems through any suitable network, such as the Internet. Examples of electronic devices that are able to incorporate the above described systems and methods include data pagers, data messaging devices, cellular telephones, or a data communication device that may or may not include telephony capabilities.

The illustrated electronic device 752 is an example electronic wireless communication device includes two-way wireless communication components to provide wireless data communication with a wireless data network, a wireless voice network, or both. Such electronic devices incorporate a wireless communication component that includes communication subsystem elements such as a wireless transmitter 710, a wireless receiver 712, and associated components such as one or more antenna elements 714 and 716. A digital signal processor (DSP) 708 performs processing to extract data from received wireless signals and to generate signals to be transmitted. The particular design of the communication subsystem is dependent upon the communication network and associated wireless communication protocols with which the device is intended to operate.

Data communication with the electronic device 752 generally includes receiving data, such as a text message or web page download, through the receiver 712 and providing that received data to the microprocessor 702. The microprocessor 702 is then able to further process the received data for output to the display 734 or to other devices such as an auxiliary I/O device 738 or through the Universal Serial Bus (USB) port 732. The electronic device 752 also allows a user to create data items, such as e-mail messages, using the keyboard 736 in conjunction with the display 734 and possibly with data received through an auxiliary I/O device 738. Such composed items are then able to be transmitted over a communication network through the transmitter 710.

The electronic device 752 performs voice communications by providing received signals from the receiver 712 to the audio subsystem 728 for reproduction by speakers 726. A user's voice is able to be converted to electrical signals from microphone 730 for transmission by transmitter 710.

A short-range communication subsystem 720 provides communication between the electronic device 752 and different systems or devices. Examples of short-range communication subsystems 720 include an infrared device and associated circuits and components, or a Radio Frequency based communication subsystem such as a Bluetooth®, Zigbee®, Wi-Fi or Wi-MAX communication subsystem to provide for communication with similarly-enabled systems and devices. In various examples, the short-range communications subsystem 720 is able to receive location-aiding audible signal activation requests that cause the electronic device 752 to emit location-aiding audible signals, as is described above.

The electronic device 752 includes a microprocessor 702 that controls device operations for the electronic device 752. The microprocessor 702 interacts with the above described communication subsystem elements to implement and control wireless communication with the network 750. The microprocessor 702 further performs control and data exchange functions by interacting with, for example, flash memory 706, random access memory (RAM) 704, auxiliary input/output (I/O) device 738, USB Port 732, display 734, light sensor 718, camera 740, keyboard 736, audio subsystem 728, microphone 730, a short-range communication subsystem 720, a power subsystem 722, and any other device subsystems.

Light sensor 718 and camera 740 in one example correspond to the light sensor 304 and camera 302, respectively, discussed above. The microprocessor 702 of one example performs the functions of the ambient light processor 306, ambient light level detector 308 and image generation processor 312. Display 734 in one example corresponds to the display 314 also discussed above.

An internal power pack, such as a battery 724, is connected to a power subsystem 722 to provide power to the circuits of the electronic device 752. The power subsystem 722 includes power distribution circuitry to supply electric power to the various components of the electronic device 752 and also includes battery charging circuitry to support recharging the battery 724. An external power supply 754 is able to be connected to the power subsystem 722. The power subsystem 722 includes a battery monitoring circuit that provide a status of one or more battery conditions, such as remaining capacity, temperature, voltage, current draw, and the like.

The USB port 732 provides data communication between the electronic device 752 and one or more external devices. Data communication through USB port 732 enables various user data, such as data files or configuration parameters for the electronic device 752 to be exchanged between the electronic device 752 and an external device. The USB port 732 is also able to be used to convey external power to the power subsystem 722 from a suitable external power supply.

Operating system software used by the microprocessor 702 is stored in flash memory 706. In addition to, or in place of, flash memory 706, a battery backed-up RAM or other non-volatile storage data elements are able to store operating systems, other executable programs, or both. As an example, a computer executable program configured to perform the image modification process 400, as described above, is included in a software module stored in flash memory 706.

Flash memory 706 is also able to store data that is used by programs executing on the microprocessor 702. RAM memory 704 is also used to store data produced or used by microprocessor 702. RAM memory is further able to temporarily store program data from flash memory 706 or from other storage locations. RAM 704 is also used to store data received via wireless communication signals or through wired communication.

The microprocessor 702 in some examples executes operating system software as well as various other software applications such as user applications, small, special purpose applications referred to as "apps," and the like. Some software, such as operating system and other basic user functions such as address books are able to be provided as part of the manufacturing process for the electronic device.

In addition to loading applications as part of a manufacturing process, further applications are able to be loaded onto the electronic device 752 through, for example, the wireless network 750, an auxiliary I/O device 738, USB port 732, short-range communication subsystem 720, or any combination of these interfaces. Once these applications are loaded into the electronic device 752, these applications are executed by the microprocessor 702.

A media reader 760 is able to be connected to an auxiliary I/O device 738 to allow, for example, loading computer readable program code of a computer program product into the electronic device 752 for storage into flash memory 706. One example of a media reader 760 is an optical drive such as a CD/DVD drive, which may be used to store data to and read data from a computer readable medium or storage product such as computer readable storage media 762. Examples of suitable computer readable storage media include optical storage media such as a CD or DVD, magnetic media, or any other suitable data storage device. The media reader 760 is alternatively able to be connected to the electronic device through the USB port 732 or computer readable program code is alternatively able to be provided to the electronic device 752 through the wireless network 750.

Information Processing System

The present invention can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of displaying an image on an electronic device, the method comprising:

performing the following with a processor:

receiving an ambient light level indicator;

determining that the ambient light level indicator is in a first range;

displaying, in response to determining that the ambient light level indicator is in the first range, a first image comprising a first presentation of data of a first data set;

determining that the ambient light level indicator is in a second range;

selecting, based on determining the ambient light level indicator is in the second range, a selected subset of the first data set, the selected subset of the first data set containing less data than the first data set;

generating, based upon the first image, a modified image, the modified image comprising a modified presentation, the modified presentation presenting the selected subset of the first data set; and displaying, in response to determining that the ambient light level indicator is in the second range, the modified image.

2. The method of claim 1, wherein the generating the modified image comprises defining the modified image to represent at least some pixels in the first image as respective bi-level pixels, each bi-level pixel being one of a bright pixel and a dark pixel.

3. The method of claim 1, wherein the generating the modified image comprises defining an enlarged presentation of at least a portion of the selected subset of the first data set, the enlarged presentation appearing larger than a presentation of the subset of the first data set that is presented in the first presentation.

4. The method of claim 1, wherein the generating the modified image comprises defining pixels in the modified image as grayscale pixels.

5. The method of claim 1, wherein the generating the modified image comprises defining pixels in the modified image by increasing brightness levels of each pixel within the first image that is above a defined level, and decreasing brightness levels of each pixel within the first image that is below the defined level.

6. The method of claim 1, wherein generating the modified image comprises generating the modified presentation by increasing a gamma value of at least some pixels in the modified image relative to gamma values of corresponding pixels in the first image.

7. The method of claim 1, further comprising:
- determining that the ambient light level indicator is within a third range, the third range associated with ambient light levels that are higher than are associated with the first range;
- increasing, in response to determining that the ambient light level indicator is within the third range, an emitted light intensity of a display presenting the modified image;
- determining that the ambient light level indicator is within a fourth range, the fourth range associated with ambient light levels that are higher than are associated with the first range,
- wherein the generating the modified image comprises inverting, in response to determining that the ambient light level indicator is within the fourth range, pixels in the first image, the inverting comprising:
  - defining pixels in the first image with brightness levels below a defined level as respective bright pixels; and
  - defining pixels in the first image with brightness levels above the defined level as respective dark pixels.

8. An image generation processor, comprising:
- a processor configured to:
  - receive an ambient light level indicator;
  - determine that the ambient light level indicator is in a first range;
  - display, in response to a determination that that the ambient light level indicator is in the first range, a first image comprising a first presentation of data of a first data set;
  - determine that the ambient light level indicator is in a second range;
  - select, based on a determination that the ambient light level indicator is in the second range, a selected subset of the first data set, the selected subset of the first data set containing less data than the first data set;
  - generate, based upon the first image, a modified image, the modified image comprising a modified presentation, the modified presentation presenting the selected subset of the first data set; and
  - display, in response to a determination that the ambient light level indicator is in the second range, the modified image.

9. The image generation processor of claim 8, wherein the processor is configured to generate the modified image by, at least in part, defining the modified image to represent at least some pixels in the first image as respective bi-level pixels, each bi-level pixel being one of a bright pixel and a dark pixel.

10. The image generation processor of claim 8, wherein the processor is configured to generate the modified image by, at least in part, defining an enlarged presentation of at least a portion of the selected subset of the first data set, the enlarged presentation appearing larger than a presentation of the subset of the first data set that is presented in the first presentation.

11. The image generation processor of claim 8, wherein the processor is configured to generate the modified image by, at least in part, defining pixels in the modified image as grayscale pixels.

12. The image generation processor of claim 8, wherein the processor is configured to generate the modified image by, at least in part, defining pixels in the modified image by increasing brightness levels of each pixel within the first image that is above a defined level, and decreasing brightness levels of each pixel within the first image that is below a defined level.

13. The image generation processor of claim 8, the processor further configured to:
- determine that the ambient light level indicator is within a third range, the third range associated with ambient light levels that are higher than are associated with the first range; and
- increase, in response to a determination that the ambient light level indicator is within the third range, an emitted light intensity of a display presenting the modified image.

14. The image generation processor of claim 13, the processor further configured to:
- determine that the ambient light level indicator is within a fourth range, the fourth range associated with ambient light levels that are higher than are associated with the first range,
- wherein the processor is configured to generate the modified image by, at least in part, inverting, in response to a determination that the ambient light level indicator is within the fourth range, pixels in the first image, the processor further configured to:
  - define pixels in the first image with brightness levels below a defined level as respective bright pixels; and
  - define pixels in the first image with brightness levels above the defined level as respective dark pixels.

15. An ambient light compensated display circuit, comprising:
- an ambient light level detector configured to detect ambient light level and produce an ambient light level indicator; and
- a processor, communicatively coupled to the ambient light level indicator, the processor configured to:
  - receive the ambient light level indicator;
  - determine that the ambient light level indicator is in a first range;
  - display, in response to a determination that that the ambient light level indicator is in the first range, a first image comprising a first presentation of data of a first data set;
  - determine that the ambient light level indicator is in a second range;
  - select, based on a determination that the ambient light level indicator is in the second range, a selected subset of the first data set, the selected subset of the first data set containing less data than the first data set;

generate, based upon the first image, a modified image, the modified image comprising a modified presentation, the modified presentation presenting the selected subset of the first data set; and display, in response to a determination that the ambient light level indicator is in the second range, the modified image; and a display configured to present the modified image.

16. The method of claim 1, wherein the selected subset of the first data set is a defined subset of the first data set.

17. The method of claim 1, wherein the selecting the selected subset of the first data set comprises excluding graphics contained within the first data set.

18. The method of claim 1, wherein the selecting the selected subset of the first data set comprises excluding defined data within the first data set.

19. The method of claim 1, the selected subset of the first data set comprising:

a first data subset having a first size in the first presentation, and a second data subset having a second size in the first presentation, and the generating the modified presentation further comprising:

enlarging a presentation in the modified presentation of the first data subset by a first amount to be greater than the first size; and enlarging a presentation in the modified presentation of the second data subset by a second amount to be greater than the first size, the first amount being greater than the second amount.

20. The method of claim 1, wherein the modified presentation presents the selected subset of the first data set with size that is unchanged relative to the first presentation of data.

* * * * *